Patented July 19, 1949

2,476,528

UNITED STATES PATENT OFFICE 2,476,528

PREPARATION OF HALOACRYLIC ACID ESTERS

Carl E. Barnes, Belvidere, N. J., assignor to General Aniline & Film Corporation, New York, N. Y., a corporation of Delaware No Drawing. Application June 23, 1945,
Serial No. 601,347

10 Claims. (Cl. 260—486)

The present invention relates to a process of producing monomeric esters of $\alpha$-haloacrylic acids. More particularly, the invention relates to the preparation of esters of $\alpha$-chloracrylic acid.

It has already been proposed to prepare monomeric esters of $\alpha$-haloacrylic acids by dehydrohalogenating the corresponding esters of dihalopropionic acids or substituted dihalopropionic acids, such as $\alpha,\beta$-dichloropropionic acid or of $\alpha,\alpha$-dichloropropionic acid and the corresponding bromo and iodo derivatives.

The proposed method of dehydrohalogenation involves the treatment of the dihalopropionic acid esters with sodium, potassium, calcium, or magnesium hydroxides, or the corresponding bicarbonates or carbonates of these metals. However, the prior art method presents serious drawbacks. For example, there is a tendency for the esters to saponify and, accordingly, rigid precautions must be taken to prevent such saponification. Thus, the prior art procedure requires that the alkali be carefully added to the dihalopropionic ester and at a rate corresponding to that substantially as rapidly as the resulting haloacrylic acid ester is formed. A further requirement is that the ester must be removed as rapidly as it is formed. Furthermore, the amount of water present must be carefully controlled since if sufficient water is present to form a solution of the alkali, considerably lower yields are obtained.

It is among the objects of my invention to provide a method of dehydrohalogenating $\alpha,\beta$- or $\alpha,\alpha$-dihalopropionic acid esters wherein the tendency of the esters to saponify is substantially eliminated, and which produces large yields of $\alpha$-haloacrylic acid esters.

It is a further object of my invention to provide a method of dehydrohalogenating $\alpha,\beta$- or $\alpha,\alpha$-dihalopropionic acid esters wherein solutions may be used and the need for removal of the $\alpha$-haloacrylic acid esters as rapidly as formed is eliminated.

Further objects of my invention will become apparent from the description which follows.

According to my invention, $\alpha,\alpha$- or $\alpha,\beta$-dihalopropionic acid esters and their derivatives are readily dehydrohalogenated by contacting the esters with a salt of a carboxylic acid. More particularly, my invention involves the dehydrochlorination of dichloropropionic esters by contacting the esters with an alkali metal or alkaline earth metal salt of a carboxylic acid. As examples of suitable salts, there may be mentioned sodium and potassium acetate and the alkali metal and alkaline earth metal salts of tartaric, lactic, citric, benzoic, ortho-methylol benzoic, salicyclic, naphthalic, phthalic, malonic, maleic, chloracetic, oxalic, and fumaric acids. Ammonium, sodium, potassium, magnesium, calcium, strontium, or barium salts of these acids are highly suitable for the purposes of my invention. However, it has been found that sodium acetate is particularly suitable for this purpose. Dehydrohalogenation is carried out very readily with this salt and the production of larger yields is obtained when dehydrohalogenating the esters of $\alpha,\beta$-dihalopropionic acid.

A unique advantage of the use of alkali and alkaline earth metal salts of carboxylic acids is that the danger of saponification of the ester formed is considerably reduced. Furthermore, the salts may be used in aqueous solution, and it is unnecessary to control the amount of water present. Of course, if it is desired, however, the salts may be used in solid form as long as there is a small amount of water present to permit the dehydrohalogenation reaction.

In general, the process may be carried out by adding a solution of the salt of the organic acid to the dihalopropionic acid ester in proportions of approximately 1 mol of the dihalopropionate to 1 mol of the salt of the carboxylic acid. If desired, the salt may be used in excess, as for example, in the ratio of 3:2. The mixture is then refluxed for several hours until the reaction is completed. The reaction mixture is then washed with water and with a mild alkaline solution, such as sodium bicarbonate, to neutralize and remove the acetic acid formed during the reaction. The mixture may be further washed with water and then dried with a suitable dehydrating agent, such as anhydrous sodium sulfate, silica, anhydrous alumina, etc. The crude $\alpha$-haloacrylic ester thus obtained may be purified by fractional distillation under reduced pressure.

The following examples are illustrative of my invention:

Example 1

A mixture of 15.7 parts by weight of methyl $\alpha,\beta$-dichloropropionate and 8.2 parts by weight of sodium acetate dissolved in water is refluxed at a temperature of 105° C. for about 3 hours. The mixture is washed with water and then with a sodium bicarbonate solution to remove the acetic acid formed. It is again washed with water and then dried with sodium sulfate. This is followed by fractional distillation under a reduced pressure. Methyl $\alpha$-chloracrylate is collected at 52° C. at a pressure of 51 mm. mercury.

Example 2

15.7 parts by weight of methyl α,β-dichloropropionate are mixed together with an aqueous solution containing 9.8 parts by weight of potassium acetate. The mixture is then refluxed until the reaction is complete. The mixture is then washed with water followed by a treatment with an aqueous solution of ptoassium bicarbonate to neutralize the acetic acid present. The resulting mixture is then dried with sodium sulfate and distilled to collect methyl α-chloracrylate.

Example 3

A mixture of 738 parts by weight of anhydrous sodium acetate, 1500 parts by weight of water and 942 parts by weight of methyl α,β-dichloropropionate together with 20 parts by weight of hydroquinone are heated to boiling with stirring for two hours. The mixture is cooled to room temperature. The mixture is then diluted with 1,000 parts by weight of water, the organic portion separating in the bottom of the vessel. This layer is drawn off, washed with 5% sodium bicarbonate and dried over anhydrous sodium sulfate. It is finally distilled under reduced pressure to recover the methyl α-chloracrylate.

Where there is a tendency for the α-haloacrylic acid ester formed to polymerize during the dehydrohalogenation action, such polymerization may be considerably reduced by conducting the dehydrohalogenation in the presence of a small amount of a polymerization inhibitor, such as copper or copper compounds, hydroquinone, sulfur, and phenylene diamine. The dehydrohalogenation reaction may be carried out at any suitable temperature. In general, it may vary from about room temperature to 150° C. or more when suitable pressure equipment is used.

While the invention has been illustrated in connection with methyl α,β-dichloropropionate, it is to be understood that other esters of α,β- and the corresponding esters of α,α-dihalopropionic acids and their corresponding derivatives, and mixtures of the α,α- and α,β-dihalo compounds, may be dehydrohalogenated in the same manner. As examples of other esters, which may be dehydrohalogenated by my process, may be mentioned the alkyl esters, such as the methyl, ethyl, propyl, isopropyl, butyl, amyl, isoamyl, n-hexyl, octyl, lauryl, and octadecyl esters of α,α- and α,β-dichloropropionic acid. In addition, there may be mentioned the corresponding alkenyl esters, such as allyl, methallyl, crotyl, oleyl, or chlorallyl esters which may be treated to form similar unsaturated esters of α-chloracrylic acid. The process is also effective in the dehydrohalogenation of polyhydric esters, such as glycol, glycerol, sorbitol, and mannitol esters, and also the aryl, heterocyclic, cycloparaffinic esters, such as, for example, phenyl, cresyl, resorcinyl, naphthyl, benzyl, fenchyl, cyclohexyl and furfuryl esters, which may be treated in the same manner to give the corresponding α-haloacrylic acid esters.

Since it is apparent that the invention may be varied without departing from the spirit and scope thereof, it is to be understood that it is not limited to the specific embodiments above set forth but only in accordance with the scope of the appended claims.

I claim:

1. A process for preparing an ester of an α-haloacrylic acid which comprises dehydrohalogenating an ester of a dihalopropionic acid having at least one halogen atom in the α-position, in the presence of a salt selected from the group consisting of ammonium, alkali metal and alkaline earth metal salts of an organic carboxylic acid and an amount of water sufficient to form an aqueous solution of said salt.

2. A process for preparing an ester of α-chloracrylic acid which comprises dehydrochlorinating an ester of a dichloropropionic acid having at least one chlorine atom in the α-position, in the presence of a salt selected from the group consisting of ammonium, alkali and alkaline earth metal salts of an organic carboxylic acid, and an amount of water sufficient to form an aqueous solution of said salt.

3. A process for preparing an ester of α-chloracrylic acid which comprises dehydrochlorinating an ester of α,β-dichloropropionic acid in the presence of a salt selected from the group consisting of ammonium, alkali and alkaline earth metal salts of an organic carboxylic acid, and an amount of water sufficient to form an aqueous solution of said salt.

4. A process for preparing methyl α-chloracrylate which comprises dehydrochlorinating methyl α,β-dichloropropionate in the presence of a salt selected from the group consisting of ammonium, alkali metal and alkaline earth metal salts of an organic carboxylic acid, and an amount of water sufficient to form an aqueous solution of said salt.

5. A process for preparing methyl α-chloracrylate which comprises dehydrochlorinating methyl α,β-dichloropropionate in the presence of sodium acetate and an amount of water sufficient to form an aqueous solution of said sodium acetate.

6. A process for preparing methyl α-chloracrylate which comprises dehydrochlorinating methyl α,β-dichloropropionate in the presence of sodium acetate and an amount of water sufficient to form an aqueous solution of said sodium acetate, the dichloropropionate and the sodium acetate being present in substantially equimolecular amounts.

7. A process for preparing methyl α-chloracrylate which comprises dehydrochlorinating methyl α,β-dichloropropionate in the presence of potassium acetate and an amount of water sufficient to form an aqueous solution of said potassium acetate, and dichloropropionate and the potassium acetate being present in substantially equimolecular amounts.

8. A process for preparing an ester of α-chloracrylic acid which comprises dehydrochlorinating an ester of α,α-dichloropropionic acid in the presence of a salt selected from the group consisting of ammonium, alkali metal and alkaline earth metal salts of an organic carboxylic acid and an amount of water sufficient to form an aqueous solution of said salt.

9. A process for preparing an ester of α-chloracrylic acid which comprises dehydrochlorinating a mixture of the corresponding ester of α,α- and α,β-dichloropropionic acid in the presence of a salt selected from the group consisting of ammonium, alkali metal and alkaline earth metal salts of an organic carboxylic acid and an amount of water sufficient to form an aqueous solution of said salt.

10. A process for preparing an ester of an α-haloacrylic acid which comprises dehydrohalogenating an ester of a dihalopropionic acid having at least one halogen atom in the α-position, in the presence of a salt selected from the group consisting of ammonium, alkali metal and alkaline earth metal salts of an organic carboxylic acid and an amount of water sufficient to form an aqueous solution of said salt, the ester of a dihalopropionic acid and the salt of an organic carboxylic acid being present in substantially equimolecular amounts.

CARL E. BARNES.

REFERENCES CITED

The following references are of record in the file of this patent:

UNITED STATES PATENTS

| Number | Name | Date |
| --- | --- | --- |
| 2,245,547 | Pollack | June 10, 1941 |

FOREIGN PATENTS

| Number | Country | Date |
| --- | --- | --- |
| 118,776 | Australia | Aug. 24, 1944 |
| 546,141 | Germany | Mar. 12, 1932 |